3,042,486
PRODUCTION OF URANIUM DIOXIDE
Frank A. Forward and Ian Harry Warren, Vancouver, British Columbia, Canada, assignors to Eldorado Mining and Refining Limited, Ottawa, Ontario Canada, a company of Canada
No Drawing. Filed Jan. 4, 1960, Ser. No. 48
7 Claims. (Cl. 23—14.5)

This invention relates to a process for producing uranium oxides. The invention is particularly directed to providing a process for producing reactor grade uranium dioxide, $UO_2$, from hexavalent uranium compounds, such as $UO_3$ and uranyl carbonate $UO_2CO_3$.

Processes are known for producing uranium oxides from carbonate leach solutions in which the desired uranium values are present as dissolved salts by reacting the solution with a reducing gas, such as hydrogen, at elevated temperature and pressure. The extent to and the rate at which uranium is recovered from the leach solution are of major importance in these known processes and the physical and chemical characteristics and the chemical purity of the uranium product are of lesser importance. Thus, the presence of small amounts of impurities, such as the catalyst employed to promote the reducing reaction, does not adversely affect the utility or the market value of the uranium product.

In the production of reactor grade uranium oxide, factors such as the physical and chemical characteristics and the chemical purity of the uranium oxide particles are of major importance. It is necessary to produce uranium oxide particles which are substantially free from impurities and which can be compacted into strong, dense shapes which do not disintegrate either in compacting or in subsequent treatments.

Uranium oxide for the production of fuel elements should be substantially free from impurities; it should have an oxygen to uranium ratio of from about 2.25 to 1 to 2.0 to 1; and should be able to be compacted and sintered to a density as near to the theoretical density of 10.9 grams per cubic centimeter as possible.

Problems have been encountered in prior investigations of processes for the production of reactor grade uranium oxides. For example, in the absence of a catalyst the reducing reaction proceeds slowly and it is difficult, if not impossible, to obtain complete reduction of the hexavalent uranium oxide to uranium dioxide, at least within an economically practical reaction period. Various types of catalysts have been tested. For example, dispersions of finely divided particles of a metal of the platinum group, such as platinum, palladium and rhodium, either as such or supported on a carrier such as kieselguhr have been suggested. These metal particles are distributed in the mixture subjected to the reducing reaction. Separation and recovery of catalyst from the reaction mixture is difficult. Loss of the costly catalyst in the catalyst recovery step adversely affects the operation cost of the overall process. The use of a nickel catalyst also is known. However, it is found that nickel dissolves in the solute content of the reaction mixture and precipitates therefrom onto the uranium oxide particles. A further difficulty is encountered when the reducing reaction is conducted in an alkaline medium in that uranium oxide tends to precipitate on the catalyst as a dense, firmly adhering film or coating which reduces, if it does not altogether destroy, the catalytic effect of the catalyst with a corresponding reduction in the rate of the reducing reaction. Also, of course, it is very difficult to effect complete separation of the catalyst from the uranium oxide.

We have found that reactor grade uranium oxide substantially free from impurities and having physical characteristics which permits it to be compacted into a hard, dense shape which does not distintegrate either in compacting or on sintering can be produced relatively inexpensively.

The process of this invention comprises, in general, the step of reacting uranyl carbonate particles dispersed in an aqueous carbonic acid solution with a member selected from the group consisting of hydrogen, carbon monoxide and a mixture thereof at a temperature above about 150° C. and under a positive partial pressure of hydrogen and carbon dioxide, in the presence of a hydrogenation catalyst and a finite amount of a catalytic promoter selected from the group consisting of anthraquinone, derivatives of anthraquinone, and ascorbic acid.

The process of this invention involves the production of reactor grade uranium dioxide from a mixture or slurry of uranyl carbonate dispersed in an aqueous carbonic acid solution. A convenient method of preparing the uranyl carbonate is to disperse particles of uranium trioxide in water and thereafter react the resulting mixture with carbon dioxide at or above atmospheric temperature. This carbonation step can be conveniently conducted in a pressure vessel such as an autoclave with a mixture or slurry which contains from about 5% to about 25% solids. Conversion of uranium trioxide to uranyl carbonate proceeds rapidly to substantially 100% completion.

The reducing reaction is conducted in a pressure vessel such as an autoclave. Factors which influence the rate, the capital and operating costs, and the completeness of the reaction and the purity of the desired uranium product are:

(a) The temperature at which the reaction is conducted.

(b) The partial pressures of hydrogen and carbon dioxide.

(c) The hydrogenation catalyst employed and the manner in which it is provided in the reaction vessel.

(d) The nature and the amount of the catalytic promoter or activating agent provided in the mixture subjected to the reducing reaction.

(e) The procedure followed in preparing the reaction mixture for the reducing reaction.

It is found that under the conditions of operation described in detail hereinafter, the rate of the reducing reaction is approximately the same regardless of the concentration of uranyl carbonate in the slurry. That is, the same number of grams of $UO_2CO_3$ is reduced to $UO_2$ per hour. For example, uranyl carbonate was reduced to uranium oxide having an oxygen to uranium ratio of 2:1 from slurries which contain about 10, 20 and 30 grams of uranyl carbonate per litre in 155, 215 and 340 minutes respectively. The percentage of uranyl carbonate solids to solution in the slurry subjected to the reducing reaction is, therefore, selected to obtain substantially complete reduction of $UO_2CO_3$ to $UO_2$ within a prescribed, practical reaction period. We have found that very satisfactory results are obtained in the reduction step of the process by treating a slurry which contains from about 5% to about 15% by weight uranyl carbonate particles.

The temperature at which the reducing reaction is conducted is not critical. At temperatures below about 150° C., the reaction proceeds relatively slowly. The reaction can be conducted at a temperature as high as about 250° C. or even higher, if desired; but the autogenous pressure developed plus the partial pressures of the hydrogen and carbon dioxide produce a total pressure which requires the use of rather costly high pressure, corrosion resistant equipment. It is preferred, therefore, to conduct the process at a temperature which produces a total pressure of about 1000 pounds per square inch, that is, within the range of from about 150° C. to about 250° C. Illustrating the effect of temperature on the reaction rate, slurries which contained about 22 grams of uranyl carbonate per litre were reacted at 210° C., 180° C., and 150° C. The uranyl carbonate was reduced to uranium oxide which had an oxygen to uranium ratio of 2:1 in periods of 170 minutes, 230 minutes and 310 minutes respectively.

The rate of the reducing reaction varies directly with the partial pressure of hydrogen and proceeds at partial pressures as low as about 10 pounds per square inch. When hydrogen is employed as the reducing gas, a preferred range of hydrogen partial pressures is from about 100 to about 750 pounds per square inch. The reducing reaction proceeds rapidly within this range and, having regard to the temperature at which the reaction is conducted, the total pressure does not require the use of costly high pressure equipment. To illustrate the effect of conducting the reducing reaction under different partial pressures of hydrogen, slurries which contained about 22 grams of uranyl carbonate per liter were reacted at 210° C. with hydrogen partial pressures of 750, 250 and 100 pounds per square inch. The uranyl carbonate was reduced to uranium oxide which had an oxygen to uranium ratio of 2:1 in periods of 170 minutes, 210 minutes and 340 minutes respectively.

Carbonic acid is present in the solution during the operation of the reducing reaction. The function of the carbonic acid is to maintain an acidity in the uranyl carbonate suspension such that the $U^{++++}$ ions which are produced at the surface of the catalyst are sufficiently soluble in the solute content of the slurry to leave the surface of the catalyst before reacting with $UO_2^{++}$ ions to produce $U_3O_8$. If the acidity is insufficient, some precipitation of $U_3O_8$ may take place on the surface of the catalyst and coat it, with resultant decrease in its catalytic activity. The carbon dioxide partial pressure necessary for maintaining the desired carbonic acid condition thus can be from about 10 pounds per square inch to a maximum imposed by pressure limitations of the reaction vessel employed. A preferred range is from about 25 to about 150 pounds per square inch when the reducing reaction is conducted at 210° C.

A number of hydrogenation catalysts can be employed in the operation of the process. Examples of suitable hydrogenation catalysts are nickel, platinum, palladium and rhodium. Heretofore, it has been customary to disperse finely divided catalytic metal particles in the solution either as such or supported on a carrier such as kieselguhr. This procedure has the disadvantage that it is difficult, if not impossible, to recover the catalyst particles from the reacted slurry. Thus, there is a loss of catalyst in this procedure and the desired uranium dioxide particles may be contaminated by the catalyst. Also, the cost of using metals of the platinum group as catalysts add materially to the overall cost of operating the process. We have found that very satisfactory results are obtained in using catalysts in a form of filaments such as gauze, strips and rods. Nickel can be used as gauze quite satisfactorily and relatively inexpensively. Relatively inexpensive metals, such as stainless steel or titanium can be clad or electro-plated with a member of the platinum group, such as platinum, palladium, and rhodium, and formed into gauze or strips to provide a relatively inexpensive catalyst.

Sufficient catalyst is provided in the reaction vessel to ensure maximum contact of the $UO_2^{++}$ ions or $UO_2^{++}$ complexes dissolved from the $UO_2CO_3$ particles during the reducing reaction. The most suitable amount can be readily determined having regard to the solids content of the slurry. In the experiments conducted on the present process, the slurries contained about 22 grams per litre of uranyl carbonate, and the surface area of the catalyst was 210 square inches.

Of the catalytic promoters or activating agents of the group anthraquinone, derivatives of anthraquinone, and ascorbic acid, the most satisfactory results have been obtained in the use of anthraquinone. It has been found, however, that anthraquinone derivatives such as 1-hydroxy anthraquinone, 1-amino-anthraquinone, 2-ethyl anthraquinone and anthraquinone sulfonic acid and alizarin and ascorbic acid can be employed with less satisfactory results, having regard to the rate of the reaction.

It has been found further that the rate of the reducing reaction varies directly with the concentration of the catalytic promoter or activating agent in the slurry. That is, the greater the concentration of catalytic promoter in the slurry, the faster is the reducing reaction. Progressively improved reducing activity is obtained with a concentration of anthraquinone within the range of from about 0.00005 to about 0.006 gram per gram of uranyl carbonate and the most satisfactory rate is with 0.006 gram per gram of uranyl carbonate. Additional amounts can be used, if desired, but are not necessary.

It is found that the manner in which the uranyl carbonate slurry is heated to reducing reaction temperature may affect the purity of the product uranium oxide. For example, if the slurry is heated to a temperature above 150° C. in the presence of a nickel catalyst, nickel may be dissolved in the solute content of the slurry. Dissolved nickel is precipitated from the solution onto the uranium oxide particles as the reducing reaction proceeds. For example, by following this procedure, uranium oxide products were obtained which contained from 0.2% to 0.5% nickel, by weight.

It is, therefore, preferred to heat water and the catalyst in a pressure vessel such as an autoclave to a temperature above about 150° C. under a partial pressure of hydrogen of, for example, about 100 pounds per square inch. Carbon dioxide is then admitted to the autoclave in amount sufficient to provide a partial pressure of carbon dioxide of, for example, about 100 pounds per square inch. The uranyl carbonate is then injected into the autoclave and the flow of hydrogen is increased to produce a total autoclave pressure of from 900 to 1,000 pounds per square inch. By following this latter procedure, uranium dioxide can be produced which contains as little as 0.01% nickel by weight when nickel is used as the catalyst.

The catalytic promoter, or activating agent, can be provided in the slurry subjected to the reducing reaction in any convenient manner. If the first mentioned procedure is followed, it can be added to the uranyl carbonate slurry fed into the autoclave or it can be injected into the autoclave during the course of the reaction. If the second mentioned procedure is followed, the catalytic promoter can be provided in the water or the uranyl carbonate fed into the autoclave or injected into the autoclave during the course of the reducing reaction. In this it is found that in the presence of a hydrogenation catalyst but without the addition of a catalytic promoter the reduction of uranyl carbonate to $U_3O_8$ proceeds rapidly but the reduction of $U_3O_8$ to uranium oxide, $UO_2$, proceeds very slowly. It would appear from this phenomenon that it is the reduction of the $U_3O_8$ to $UO_2$ which is promoted by the catalytic promoter. Thus, it may be preferred to inject the catalytic promoter into the reaction vessel after the initiation of the reducing reaction.

The following examples illustrate the improved reactor grade uranium oxide which can be produced by the process of this invention.

EXAMPLE 1

This series of tests illustrates the effect of the catalytic promoters of this invention on the rate of the reduction of uranyl carbonate to uranium oxide.

*Test 1.*—73 grams of uranyl carbonate were dispersed in 1 litre of water. 2 litres of water were charged into an autoclave which contained a nickel gauze catalyst. The water was heated to 210° C. under a partial pressure of hydrogen of 100 pounds per square inch, at which temperature sufficient carbon dioxide was admitted to the vessel to produce a partial pressure of 100 pounds per square inch. The uranyl carbonate slurry was then charged into the reaction vessel and additional hydrogen was admitted to produce a total pressure of 950 pounds per square inch. At the end of 360 minutes reaction period the uranium oxide produced had an oxygen to uranium ratio of 2.6:1, equivalent to $UO_{2.6}$ and had a nickel content of 0.04% by weight.

*Test 2.*—The conditions of test 1 were repeated with the difference that 0.006 gram of anthraquinone per gram of uranyl carbonate was added to the slurry. All the uranyl carbonate was reduced in 120 minutes to uranium oxide which had an oxygen to uranium ratio of 2:1.

*Test 3.*—The conditions of test 2 were repeated with the difference that 0.006 gram of 2-ethyl-anthraquinone per gram of uranyl carbonate was added to the slurry. The reducing reaction was completed in 270 minutes to an oxygen to uranium ratio of 2.02:1.

*Test 4.*—The conditions of test 2 were repeated with the difference that 0.006 gram of 1-hydroxy-anthraquinone per gram of uranyl carbonate was added to the slurry. The reducing reaction was completed in 340 minutes to an oxygen to uranium ratio of 2.12:1.

*Test 5.*—The conditions of test 2 were repeated with the difference that 0.006 gram of 1-amino-anthraquinone per gram of uranyl carbonate was added to the slurry. The reducing reaction was completed in 380 minutes to an oxygen to uranium ratio of 2.11:1.

The nickel content of the uranium oxide products of these tests were less than 0.02% by weight.

EXAMPLE 2

The following series of tests illustrates the effect of different concentrations of anthraquinone on the nickel contents and the physical characteristics of the uranium oxide products.

In each test, the starting material was uranyl carbonate derived from $UO_3$ dispersed in water and reacted at atmospheric temperature, about 21° C., with carbon dioxide. The uranyl carbonate slurry, about 5% solids, was reacted at 210° C. with hydrogen in an autoclave. The partial pressures of hydrogen and carbon dioxide were respectively 600 and 100 pounds per square inch, to produce a total pressure of 1000 pounds per square inch. Each test was conducted for a period of 120 minutes.

Table 1

| Anthraquinone Grams per gram $UCO_3$ | U:O Ratio | Ni, Percent | Surface Area, Sq. Meters/gram | Sintered Density, Grams/cc. | Spalled and Capped |
|---|---|---|---|---|---|
| -------- | 1:2.25 | 0.14 | Not determined. | Not determined. | Yes. |
| 0.001 | 1:2 | 0.01 | 1.7 | 10.5 | Yes |
| 0.002 | 1:2 | 0.02 | 2.0 | Not determined. | -------- |
| 0.004 | 1:2 | 0.05 | 4.2 | 10.5 | -------- |
| 0.008 | 1:2 | 0.05 | 9.2 | 10.5 | No |
| 0.016 | 1:2 | 0.12 | 10 | Not determined. | No |

EXAMPLE 3

This example illustrates the effect of the partial pressure of carbon dioxide on the surface area of the product uranium dioxide particles. An aqueous carbonic acid slurry which contained about 5% by weight of uranyl carbonate particles with 0.006 gram of anthraquinone added per gram of uranyl carbonate was reacted at 210° C. with hydrogen at a partial pressure of 400 pounds per square inch, and under partial pressures of carbon dioxide of 35, 70 and 140 pounds per square inch. The surface areas of the $UO_2$ particles produced in these tests were 9.2, 8.6 and 7.0 square meters per gram, respectively.

The process of producing reactor grade uranium dioxide of this invention possesses a number of important advantages. Uranium dioxide particles can be produced which are substantially free from impurities and which possess physical characteristics which permit them to be compacted into strong, dense compacts suitable for use as reactor fuel without spalling during the compacting and sintering steps. The reducing reaction proceeds rapidly to completion and can be readily conducted to produce uranium oxide which has an oxygen to uranium ratio within the range of from about 2.2:1 to about 2.0:1 with substantially complete reduction of the uranyl carbonate to uranium oxide. A relatively inexpensive hydrogenation catalyst, such as nickel, can be employed in the reducing reaction without serious contamination of the product uranium oxide and relatively costly platinum group metals can be employed without loss of catalyst. The process can be conducted in readily available, relatively inexpensive equipment and the use of costly, high pressure, corrosion resistant material is avoided.

It will be understood, of course, that modifications can be made in the preferred embodiments of the process described herein without departing from the scope of the invention as defined by the appended claims.

What we claim as new and desire to protect by Letters Patent of the United States is:

1. The process of producing reactor grade uranium oxide which comprises the steps of reacting uranyl carbonate particles dispersed in an aqueous carbonic acid solution with carbon dioxide and a reducing gas selected from the group consisting of hydrogen, carbon monoxide and a mixture thereof, at a temperature above about 150° C. and under positive partial pressures of reducing gas and carbon dioxide in the presence of a hydrogenation catalyst and a finite amount of a catalytic promoter selected from the group consisting of anthraquinone, 1-hydroxy anthraquinone, 1-amino-anthraquinone, 2-ethyl anthraquinone, anthraquinone sulphonic acid, alizarin, and ascorbic acid, continuing the reaction to convert uranyl carbonate to uranium oxide, and recovering uranium oxide from the reaction mixture.

2. The process according to claim 1 in which the hydrogenation catalyst is a member selected from the group consisting of nickel, platinum, palladium and rhodium.

3. The process according to claim 1 in which the hydrogenation catalyst is in the form of metal gauze.

4. The process of producing reactor grade uranium dioxide which comprises the steps of charging uranyl carbonate into a reaction vessel heated to a temperature above about 150° C. and maintained under positive partial pressures of hydrogen and carbon dioxide, reacting said uranyl carbonate dispersed in an aqueous carbonic acid solution with hydrogen and carbon dioxide in the presence of a hydrogenation catalyst and a finite amount of a catalytic promoter selected from the group consisting of anthraquinone 1-hydroxy anthraquinone, 1 - amino-anthraquinone, 2-ethyl anthraquinone, anthraquinone sulphonic acid, alizarin, and ascorbic acid, maintaining said reaction vessel under positive partial pressures of reducing gas and carbon dioxide during said reaction, continuing said reaction to reduce uranyl carbonate to uranium dioxide, and recovering uranium dioxide from the reaction mixture.

5. The process according to claim 4 in which the hydrogenation catalyst is a member selected from the group consisting of nickel, platinum, palladium and rhodium.

6. The process according to claim 4 in which the hydrogenation catalyst is in the form of metal gauze.

7. The process of producing reactor grade uranium oxide which comprises the steps of heating water and a hydrogenation catalyst in a reaction vessel to a temperature above about 150° C. in the presence of a reducing gas selected from the group consisting of hydrogen, carbon monoxide and a mixture thereof, feeding carbon dioxide into said reaction vessel in amount sufficient to produce and maintain a positive partial pressure thereof in said reaction vessel, feeding uranyl carbonate particles dispersed in an aqueous carbonic acid solution into said reaction vessel, providing in said reaction vessel a finite amount of a catalytic promoter selected from the group consisting of anthraquinone, 1-hydroxy anthraquinone, 1-amino-anthraquinone, 2-ethyl anthraquinone, anthraquinone sulphonic acid, alizarin, and ascorbic acid in amount greater than about 0.0005 gram per gram of uranyl carbonate, reacting the charge in the reaction vessel with reducing gas and carbon dioxide at a temperature above about 150° C. and under positive partial pressures of carbon dioxide and a reducing gas selected from the group consisting of hydrogen, carbon monoxide and a mixture thereof to reduce said uranyl carbonate to uranium oxide, continuing the reaction to convert uranyl carbonate to uranium oxide, and recovering uranium oxide from the reaction mixture.

References Cited in the file of this patent

UNITED STATES PATENTS 2,727,806     Forward et al. _____ Dec. 20, 1952